3,431,239
MERCAPTAN TERMINATED POLYETHERS
Lester Morris, Ron E. Thompson, and Irvin P. Seegman, Encino, Calif., assignors to Products Research & Chemical Corporation, a corporation of California
No Drawing. Filed Mar. 29, 1965, Ser. No. 443,699
U.S. Cl. 260—48   17 Claims
Int. Cl. C08g 23/20, 23/00

ABSTRACT OF THE DISCLOSURE

Mercaptan terminated liquid polyethers having the general formula R—[A—O—B(SH)$_{m-1}$]$_n$ wherein R is lower alkyl and ranges from $C_2$ to $C_6$, A is polyalkylene oxide or a mixture of polyalkylene oxides having alkyl radicals ranging from $C_2$ to $C_4$, the number of repeating alkylene units ranging from about 2 to 200, B is the fragment or grouping in the halogen-substituted organic compound B(X)$_m$ which results from the dehalogenation of B(X)$_m$, wherein X is halogen and $m$ is an integer ranging 2 to 4, O is oxygen, SH is mercapto and $n$ is an integer ranging from 2 to 4. Halogenated terminated polyethers which are intermediates for producing the above polymers. A method for producing such polymers which includes (1) reacting a polyalkylene oxide with an alkali metal, (2) reacting the thus formed metal alkoxide with a polyhalo organic compound, (3) reacting the product of (2) with a sulfur containing compound to produce a sulfur-containing halogen salt, and (4) hydrolyzing said salt with an alkaline compound and neutralizing the excess alkalinity.

---

This invention relates to mercaptan terminated liquid polymers, to method for producing the same, and to solid elastomers made therefrom. More particularly, this invention relates to mercaptan terminated liquid polyethers derived from polyalkylene glycols.

Organic liquid materials capable of being vulcanized or "cured" to solid rubbery elastomers at ambient temperatures have been found valuable in a wide variety of applications, particularly in the formulation of sealants, protective coatings and adhesives, where high resistance to oxygen, ozone, organic solvents, oils, and fuels is required. Economic considerations have limited the use of such organic materials essentially to two types, namely mercaptan terminated polysulfides and polyurethanes.

The production of mercaptan terminated liquid polysulfides, however, involves expensive equipment and costly processing steps. In a typical synthesis, mixtures of polychloro ethers and sodium tetrasulfide are emulsified in water to form a solid dispersion which is subsequently depolymerized by the introduction of selected mercaptans to form an equilibrium mixture. The product is then washed and dried. The resultant yields are very low, generally of the order of about 50% of the added components.

The use of polyurethanes is similarly subject to attendant disadvantages, namely in the requirement of a primer and in the tendency of polyurethanes to blow in the presence of water.

Other organic liquid materials have found only limited application due to very low yields and low conversion efficiencies in their methods of production resulting in undesirable by-products and considerable unreacted materials.

The present invention provides novel liquid polymers and a unique method of producing the same involving low cost processing equipment and resulting in extremely high yields at excellent conversion efficiencies. The products are unusually light in color and free of mercaptan odors. The novel cured elastomers prepared from the liquid polymers of the present invention exhibit excellent adhesion, excellent water, weather and heat resistance, as well as other superior properties, including resistance to thermal softening, compression set and hydrocarbons.

The present invention also provides a novel reactive intermediate compound and method for producing the same which intermediate is capable of reacting with compounds containing reactive modifying groups to produce the novel liquid polyethers described herein.

It is an object of this invention, therefore, to disclose and provide mercaptan terminated liquid polyethers derived from polyalkylene glycols.

Another object of this invention is to provide a method of producing mercaptan terminated liquid polyethers in high yields and at high conversion efficiencies, utilizing inexpensive processing equipment and low cost processing steps.

Another object of this invention is to disclose and provide mercaptan terminated liquid polyethers having superior color and odor characteristics and capable of being cured to elastomers exhibiting superior water, weather and heat resistance.

Another object of this invention is to disclose and provide a reactive intermediate compound derived from polyalkylene glycols useful in the production of mercaptan terminated liquid polyethers and a method of producing the same.

Another object of this invention is to disclose and provide a method of curing mercaptan terminated liquid polyethers and rubbery elastomers therefrom having superior properties, including excellent adhesion and resistance to thermal softening, compression set, oxygen, ozone, organic solvents, oils and fuels.

A further object of this invention is to disclose and provide mercaptan terminated liquid polyethers prepared by reacting compounds containing reactive modifying groups with a reactive halogenated intermediate compound derived from polyalkylene glycols.

Other objects and advantages will become apparent upon reading the following description and claims.

The present invention provides mercaptan terminated liquid polyethers having the general formula

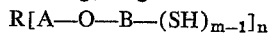
R[A—O—B—(SH)$_{m-1}$]$_n$ wherein R is lower alkyl and ranges from $C_2$ to $C_6$, A is polyalkylene oxide or a mixture of polyalkylene oxides having alkyl radicals ranging from $C_2$ to $C_4$, the number of repeating alkylene units ranging from about 2 to 200, B is the fragment or grouping in the halogen-substituted organic compound B(X)$_m$ which results from the dehalogenation of B(X)$_m$, wherein X is halogen and $m$ is an integer ranging from 2 to 4, O is oxygen, SH is mercapto and $n$ is an integer ranging from 2 to 4.

The method of the present invention involves reacting a metal or metal hydride, preferably an alkali metal in dispersion, with a primary or secondary polyalkylene oxide glycol, preferably a diol or triol, to form a metal alkoxide. An active halogen derivative may then be prepared by reacting the alkoxide with an active polyhalogen-substituted organic compound. The organic compound may be any halogen compound containing at least two halogen atoms which shows essentially complete reaction with the potassium salt of the polyalkylene oxide glycol during a period not exceeding 24 hours at temperatures not exceeding about 140° F. The halogen derivative is reacted with a sulfur donor, preferably thiourea, to produce a sulfur-containing halogen salt. The latter is hydrolyzed to the mercaptan, preferably with caustic solution. Excess alkalinity may be neutralized with acid and the product is preferably filtered hot through a filter press.

The various reactants are used in stoichiometric amounts although an excess of any compound may be used when deemed desirable.

The invention may be further illustrated in connection with the preparation of a preferred embodiment, as set forth below in the examples, which are not intended to be limitative. A mercaptan terminated polyether having the formula

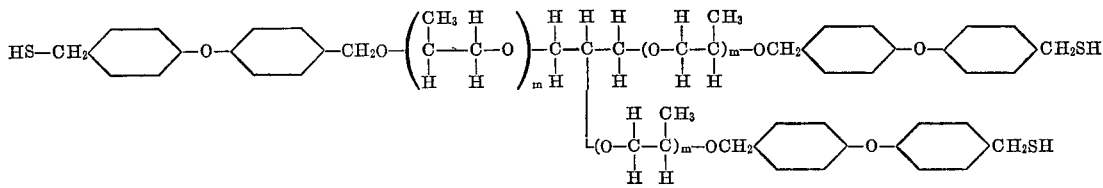

wherein $m$ is equal to 34, (and may range from about 2 to 50), was prepared in the following manner:

EXAMPLE I

Preparation of sodium alkoxide

A sodium dispersion was prepared by heating 715 grams of terphenyl (Monsanto Chemical Company's HB–40) to 250° F., stirring in 2.75 grams of aluminum octoate and adding 382 grams of sodium metal on a high speed dissolver. The mass was stirred for about twenty minutes.

To a separate covered and jacketed vessel, there were charged 1,889 grams of polypropylene glycol of M.W. 5667 (Union Carbide and Carbon's Niax Triol LHT 28) and 72 grams of the previously prepared sodium dispersion. Stirring was maintained for about two hours until the sodium was dissolved. The temperature was carefully controlled so that it would not rise above about 140°–150° F.

EXAMPLE II

Preparation of halogen derivative of alkoxide

To the sodium alkoxide prepared in Example I, there were added 240 grams of di(chloromethyl) diphenyl oxide (Dow Chemical Company's CMDPO–25). The exotherm was kept from rising above 140° F. The reaction of the alkoxide and the halogen compound was complete in about two hours. The reactive halogen intermediate produced was used in the preparation of the mercaptan terminated polyether as set forth below.

EXAMPLE III

Preparation of thiouronium chloride salt

To the halogenated derivative of the sodium alkoxide prepared in Example II, there were added 87 grams of thiourea crystals. The mass was heated at 200° F. for 6 hours.

EXAMPLE IV

Preparation of mercaptan terminated polyether

The thiouronium salt produced in Example III was hydrolyzed by heating at 200° F. for an additional 2 hours with 40 grams of sodium hydroxide dissolved in 40 grams of water.

The excess caustic was neutralized with concentrated HCl. The product was filtered hot through a filter press.

A yield of 93% at 95% conversion of the theoretical trimercaptan was obtained.

In addition to polypropylene glycol, diols as well as other triols of different molecular weight and other polyols may be used in the preparation of the alkali metal alkoxide with good results. Primary as well as secondary alcohols may be used although primary alcohols are preferred since it has been found that secondary alcohols cannot be utilized at temperatures above about 150° F. Fatty monoglycerides and mono fatty esters of the lower polyols may, in some instances, also be used. The preferred starting materials are the polypropylene glycols, polyethylene glycols and polybutylene glycols.

Alkoxide salts may be prepared from potassium or lithium to acquire particular degrees of reactivity. Other metals, for example aluminum, as well as metal hydrides, may be used to react with the polyalkylene oxide glycol.

Suitable polyhalogen-substituted organic compounds may be determined by testing their reactivity with the potassium salt of a polyalkylene oxide glycol. Essentially complete reaction should be effected at temperatures of about 140° F. or below in 24 hours or less. Examples of other suitably polyhalo organic compounds are dibromoethylene, bromochloroethylene and dibromomethane, trichloroethylene; 1,1,2-trichloroethane; 1,1,1-trichloroethane; 1,2,3-trichloropropane and 1,2,3-tribromopropane. Combinations of polyhalogen compounds which show unequal activities of the halogens are particularly desirable.

The halogen derivative of the alkoxide constitutes a highly reactive intermediate which combines readily with compounds containing reactive modifying groups, for example sulfur-containing compounds, to produce polymeric compounds of highly desirable properties.

In addition to thiourea and substituted thioureas, examples of other sulfur bearing donors which may be used are sodium sulfhydrate, sodium thiocarbamate, potassium ethyl xanthate and thiolacetic acid. The sulfur-containing compounds are preferably thiourea or substituted thioureas and mercaptans and mercapto salts in which the donor sulfur is attached to a group which is readily removable by hydrolysis, including

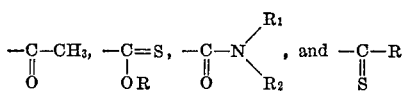

where R, $R_1$ and $R_2$ are alkyl radicals having from 1 to 6 carbon atoms.

Hydrolysis may be accomplished with any suitable alkaline or acidic compound. Upon completion of hydrolysis and neutralization, the product may be filtered hot through a filter press. Instead of filtration, there may be added hot or cold water, if desired, to dissolve all the soluble by-products and the material may then be centrifugally separated. Small additions of plasticizers or solvents may also be made, if desired, to increase processing ease.

The mercaptan terminated polyethers of the present invention, which may be cured to rubbery elastomers, may vary in molecular weight from about 1,000 to about 15,000 and higher. For example, a preferred polymer prepared from polypropylene glycol and (di(chloromethyl) diphenyl oxide as set forth above has a molecular weight of about 7,500. The viscosity of the polyethers may vary from about 50 centipoises to about 100,000 centipoises.

The liquid polyethers may be used with soluble curing agents in the impregnation of leather, fabrics and wood. They may be cured to a material having the characteristics of a rubbery elastomer. The polyethers may be compounded with fillers, reinforcing pigments and modifying resins and plastics and may be used as sealants, casting compounds, coatings and adhesives. For example, they may be used as sealants between metal surfaces, in the pressurization of aircraft, as sealants in air and gas ducts, as protective linings in gasoline reservoirs and containers, as adhesives, and in many other useful applications.

The physical and chemical properties of the cured composition may be varied to produce a product best suited to the methods of application and the specific use to which it is to be applied by addition thereto of fillers, pigments, reinforcing agents, resins, plasticizers and the like. These may be blended into the liquid polymers on a suitable mill such as a roller mill or paint mill and the curing agent thereafter incorporated in any suitable manner.

The mercaptan terminated polyethers may be cured with a wide variety of curing agents and may be employed in conjunction with different types of curing systems. They may, for example, be utilized in systems wherein cure is initiated just prior to use by adding a curing agent such as an oxidizing agent, e.g. lead dioxide or zinc peroxide, to a base polymer previously separately compounded with fillers, reinforcing pigments etc. and thoroughly mixing the curing agent therewith. Alternatively, the base polymer composition may be premixed with the curing agent under anhydrous conditions and then, immediately prior to use, a solvent such as water or an organic compound, is added and mixed with the premixed composition. See for example United States Patent No. 2,466,963 to Joseph C. Patrick and Harry R. Ferguson and No. 2,787,608 to George Gregory and Irvin P. Seegman.

The polyethers of the present invention may be used most advantageously in a one-part stable hydroscopic liquid composition which can be completely cured without agitation, in accordance with the method disclosed in United States Patent No. 3,225,017 to Irvin P. Seegman, Lester Morris and Paul A. Mallard.

In a one-part system, there is thoroughly dispersed within the polymer a dormant curing agent for the polymer which is activated by the presence of moisture. Similarly, there is thoroughly dispersed within the polymer a water-soluble deliquescent accelerating agent adapted to attract and absorb moisture from the surroundings and to hasten the curing of the polymer by the curing agent. The polymer may be initially dried to remove any moisture or, preferably, the deliquescent accelerating agent may also be a desiccating agent to dry the polymer. Alternatively, the polymer may have thoroughly dispersed therein a single desiccating, delinquent, dormant curing and accelerating agent which is adapted to dry the polymer, to attract and absorb moisture from the surroundings, to cure the polymer when activated by the presence of moisture and to hasten the curing of the polymer. Such surroundings may include a body of water or a body of gas containing essentially only moisture such as atmospheric air of normal humidity.

By simply depositing the present composition in place and then curing solely by contact of its surface with surroundings containing essentially only moisture, the mixing step and mixing equipment required in prior curing methods are eliminated and the formation of air bubbles in the cured elastomer which would result from a mixing step is precluded. In addition, the composition may be packaged in a single suitable container and applied directly to the place where it is used. After deposition in place, even thick bodies of composition may be cured merely by contact with atmospheric air without the addition of separate curing agents.

The deliquescent accelerating agent is preferably a desiccant and must be water-soluble. It may be present in amounts ranging from 0.5 to 50 parts per 100 parts by weight of the polymer. It has been found that alkaline materials such as alkali metal and alkaline earth metal oxides, peroxides, hydroxides and salts of weak acids have such useful characteristics. Some specific examples of compound which may be used for such purpose are sodium oxide, sodium peroxide, potassium hydroxide, sodium hydroxide, sodium acetate, sodium carbonate, sodium phosphate, sodium molybdate, calcium oxide, barium oxide, calcium peroxide, barium peroxide, calcium hydroxide and strontium hydroxide. In addition, it has been found that barium oxide is unexpectedly unusually effective as a desiccating, deliquescent accelerating agent. It has also been found that alkali metal and alkaline earth metal peroxides, such as sodium peroxide, calcium peroxide and barium peroxide may be used as single desiccating, deliquescent, curing and accelerating agents.

Among the many curing agents which may be used are organic oxidizing agents such as dinitro benzene; inorganic oxides including the alkali metal and alkali metal salt peroxides, such as sodium peroxide, sodium pyrophosphate peroxide, sodium carbonate peroxide and sodium perborate; the alkaline earth metal peroxides such as calcium peroxide and barium peroxide; and other metal oxides and peroxides such as manganese dioxide and zinc peroxide.

It has been found that certain curing agents are extremely effective particularly in the production of cured elastomers and thioplasts capable of withstanding prolonged exposures to temperatures as high as 350° F. without heat softening or material change in other properties. Such curing agents comprise the group of soluble salts of chromic acid such as chromates, bichromates and trichromates including the sodium, potassium and ammonium chromate and, bichromate salts. Any soluble salt of chromic acid which, upon solution, liberates anions containing chromium may be used in this invention. Such salt should preferably have a solubility in the solvent equal to or greater than that of potassium bichromate, i.e. about 12 grams per 100 ml. of water at 20° C. Other chromates include lithium, rubidium, cesium, magnesium and calcium chromate and bichromates, potassium chlorochromate, ferric bichromate, strontium bichromate and the bichromates of zinc, copper, cobalt and nickel. Organic chromates include tertiary butyl chromate and bichromate, and guanidine chromate and bichromate. Trichromates include sodium, potassium and strontium trichromate.

The curing agents should be used at least in stoichiometric amounts but may range from about 3 parts to about 20 parts per 100 parts by weight of polyether, and more preferably from about 3 to 10 parts per 100 parts by weight of polyether. A cured composition resulting from the use of polyethers with a curing agent alone may contain as high as about 97% by weight of the polyether. The amount of solvent, when present, is generally about 2 to 5 parts per 100 parts polymer by weight, with water generally being in the lower end of this range. The polyether content in compositions containing fillers, pigments, resins, plasticizers, curing agents, etc. may range from about 40% to 97% by weight.

The addition of and increase in amount of fillers, pigments and reinforcing agents such as calcium carbonates, iron oxide, aluminum powder, silicon dioxide, clays, zinc sulfide, carbon black, rayon floc, titanium dioxide, etc., will, in general, increase the Shore hardness, toughness and tensile strength and decrease elongation of the product.

The adhesiveness of the cured composition to metals, glass, resin-coated objects, etc. may be greatly increased without destruction of other properties by the addition of various resinous or plastic compositions generally in the ratio of 1 to 20 parts per 100 parts of the polymer by weight although as high as 50 parts may be used. Due to their resistance to heat, water and to chemicals, the phenolic and epoxy resins are the preferred resins for this purpose for use with the compositions of this invention.

Other additives which may be used in the composition of the present invention include plasticizers, such as chlorinated diphenyls. These compounds increase the fluidity of the composition and improve the dispersion of the solids. Plasticizers also improve elongation and reduce the hardness of the cured composition.

EXAMPLE V

| One-Part Sealant | Parts by Wt. | Parts by Wt. |
|---|---|---|
| Polyether [1] | | 100 |
| Polyether [2] | 100 | |
| Calcium Carbonate | 30 | 50 |
| Titanium Dioxide | 18 | 25 |
| Carbon black dispersion | 0.95 | |
| Arochlor 1254 [3] | 35 | 35 |
| Barium Oxide | 5 | 5 |
| Calcium Peroxide | 11 | 11 |
| Toluene | 5 | 3 |
| Epon 1001 [4] | 5 | 5 |

[1] Prepared as Examples I to IV, filtered.
[2] Prepared in Examples I to IV, water washed instead of filtered.
[3] A chlorinated diphenyl produced by Monsanto Chemical Co.
[4] 80% solution in methyl ethyl ketone of an epoxy resin produced by Shell Chemical Co.

All ingredients were mixed in a paint mill and the resulting composition was loaded into sealed cartridges suitable for use in a standard extrusion gun. At intervals, as desired, some of the cartridges extruded into test panels. The material cured into rubber-like compositions. The following results were obtained:

| | | |
|---|---|---|
| Brookfield Viscosity (Spindle No. 7 at 2 r.p.m.) | 9,440 poises | 10,000 poises. |
| Tack-free Time [5] | 8 hours | 16 hours. |
| Cured 24 hrs. at 120° F. and 100% relative humidity | 1¼″ depth Rex 24 [7] | ⅛″ depth Rex 15 [8]. |
| After Hardening (Rex hardness after 48 hrs. at 158° F.) | Rex 29 | Rex. 20. |
| Adhesion to 6061 aluminum [6] | 2 lbs | 6 lbs. |
| Cured 24 hrs. at 120° F. and 100% relative humidity | Adhesive | Low Level cohesive. |

[5] MIL-S-7502.
[6] MIL-S-7502 Peel Test.
[7] Equivalent to Shore A hardness of about 28.
[8] Equivalent to Shore A hardness of about 19.

The cure rate compares with a cure rate of about 72 hours obtained with polysulfides under similar conditions.

The after-hardening rise is slight compared to the rise of from 15 to 30 in hardness normally obtained with typical polysulfide-based formulations.

EXAMPLE VI

Two-part potting compound and industrial sealant

| Polyether (prepared as in Examples I to IV) | | |
|---|---|---|
| parts by weight | | 100 |
| Stearic acid | do | 0.06 |
| Zinc stearate | do | 0.07 |
| Lead peroxide, technical | do | 14.80 |
| Barium oxide | do | 6.00 |
| Water | do | 2.00 |
| Cure time (MIL-S-7502) | minutes | 15 |
| Shore A hardness (MIL-R-2065) | do | 15 |
| After-hardening (Shore A hardness after 48 hrs. at 158° F.) | minutes | 20 |
| Water absorption—24 hours | percent | 2 |

The rise in after-hardening of this formulation was also very small compared to that obtained with polysulfides. The results also show that the water resistance of the polyether formulation is as high as the polysulfides.

EXAMPLE VII

Two-part potting compound and primary sealant

| Base: | | |
|---|---|---|
| Polyether (prepared as in Examples I to IV) parts by weight | | 352 |
| Carbon black | do | 54 |
| Liquid coal tar | do | 580 |
| Water | do | 43 |
| Accelerator: | | |
| Liquid coal tar | do | 668 |
| Carbon black | do | 227 |
| Sodium dichromate | do | 77 |
| Sulfur | do | 3 |
| Water | do | 54 |
| Application life (MIL-S-7502) | minutes | 40 |
| Shore A hardness (MIL-R-3065) | do | 35 |
| After-hardening (Shore A hardness after 48 hrs. at 158° F.) | minutes | 40 |
| Adhesion (Interim Federal Spec. SS-S-00200A) | p.s.i | 60 |
| Fuel extraction (Interim Federal Spec. SS-S-0200A) | percent | +2.29 |
| Resilience (Interim Federal Spec. S-S-S-00200A) | percent | 96 |

The resilience compares with about 70% resilience normally obtained with polysulfide formulations.

The after-hardening rise in these types of formulations was also very small compared with polysulfides.

It will be understood that the foregoing description and examples are only illustrative of the present invention and it is not intended that the invention be limited thereto. Various modifications and alterations of the present invention may be made without departing from the spirit thereof and the scope of the appended claims.

We claim:

1. Mercaptan terminated polyethers having the formula $R-[A-O-B-(SH)_{m-1}]_n$ wherein R is lower alkyl and ranges from $C_2$ to $C_6$, A is polyalkylene oxide having an alkyl radical ranging from $C_2$ to $C_4$, the number of repeating ankylene units ranging from about 2 to 200, B is the fragment in the halogen-substituted organic compound $B(X)_m$ which results from the dehalogenation of $B(X)_m$, wherein X is halogen and $m$ is an integer ranging from 2 to 4, O is oxygen, SH is mercapto and $n$ is an integer ranging from 2 to 4.

2. Mercaptan terminated polyethers according to claim 1, wherein R is $C_3$ alkyl and A is polypropylene oxide.

3. The compound having the formula:

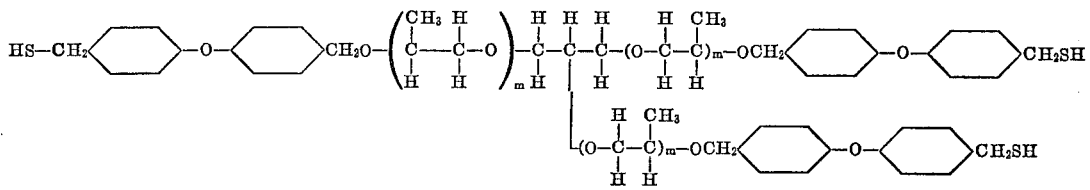

wherein $m$ ranges from about 2 to 50.

4. The compound of claim 3 wherein *m* is equal to about 34.

5. Halogen terminated reactive polyethers having the formula R—[A—O—B—(X)$_{m-1}$]$_n$ wherein R is lower alkyl and ranges from C$_2$ to C$_6$, A is polyalkylene oxide having an alkyl radical ranging from C$_2$ to C$_4$, the number of repeating alkylene units ranging from about 2 to 200, B is the fragment in the halgen-substituted organic compound B(X)$_m$ which results from the dehalogenation of B(X)$_m$, X is halogen, *m* is an integer ranging from 2 to 4, O is oxygen and *n* is an integer ranging from 2 to 4.

6. A halogen terminated polyether having the formula:

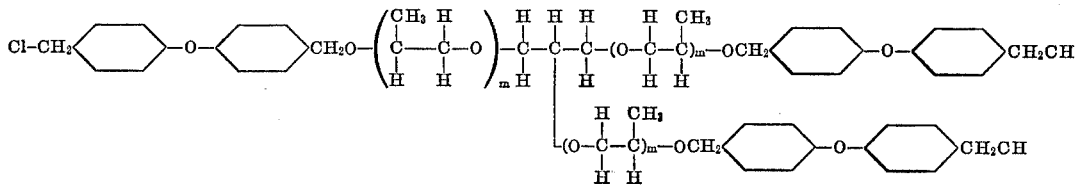
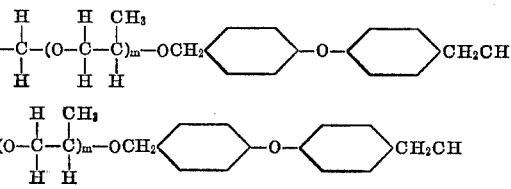

wherein *m* ranges from about 2 to 50.

7. A halogen terminated polyether according to claim 6, wherein *m* is equal to about 34.

8. A method of producing mercaptan terminated polyethers which comprises reacting a polyalkylene oxide glycol with an alkali metal in dispersion to form a metal alkoxide, reacting the alkoxide with a polyhalo organic compound capable of reacting essentially completely with the potassium salt of the polyalkylene oxide glycol during a period not exceeding 24 hours at a temperature not exceeding about 140° F., reacting the halogen derivative of alkoxide thus produced with a sulfur-containing compound selected from the group consisting of thiourea, substituted thiourea, mercaptans, and mercapto salts in which the donor sulfur is attached to a group which is readily removable by hydrolysis to produce a sulfur-containing halogen salt, hydrolyzing the sulfur-containing halogen salt with an alkaline compound and neutralizing excess alkalinity with an acidic compound.

9. A method according to claim 8 in which the group removable by hydrolysis is selected from

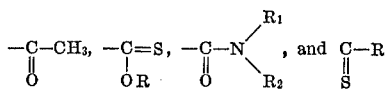

wherein R, R$_1$ and R$_2$ are alkyl radicals having from 1 to 6 carbon atoms.

10. A method of producing halogen terminated polyethers capable of reacting readily with substances containing reactive modifying groups which comprises reacting a polyalkylene oxide glycol with an alkali metal in dispersion to form a metal alkoxide, and reacting the alkoxide with a polyhalo organic compound capable of reacting essentially completely with the potassium salt of the polyalkylene oxide glycol during a period not exceeding 24 hours at a temperature not exceeding about 140° F.

11. A composition containing between about 40 to about 97 weight percent of the mercaptan terminated liquid polyether of claim 1 curable to a synthetic rubber and from about 3 to about 20 parts of a curing component per 100 parts by weight of the polyether.

12. A composition according to claim 11 wherein the the curing component comprises a soluble salt of chromic acid capable, upon solution, of liberating anions containing chromium.

13. An elastomer prepared by curing a composition at normal temperatures, said composition containing the mercaptan terminated polyether of claim 1 curable to a synthetic rubber with a curing component in solution in a solvent selected from the group consisting of water and organic solvents, said curing component comprising a soluble salt of chromic acid having a solubility at 20° C. in water at least as great as that of potassium bichromate in water at 20° C. and being capable, upon solution, of liberating anions containing chromium.

14. A method of producing cured elastomers having the ability to withstand exposure to high temperatures and materially increased resistance to hydrocarbon solvents which comprises incorporating into the mercaptan terminated liquid polyether of claim 1 curable to a synthetic rubber in the presence of a solvent selected from the group consisting of water and organic solvents, about 3 to about 20 parts of a curing component per 100 parts by weight of the polyether, said curing component comprising a soluble salt of chromic acid capable, upon solution, of liberating anions containing chromium and having a solubility at 20° C. in water at least as great as that of potassium bichromate in water at 20° C.

15. A one-part stable hydroscopic liquid polymer composition adapted to be completely cured solely by contact of its surface after deposition in place with surroundings containing essentially only moisture, said composition comprising (a) the liquid mercaptan terminated polyether of claim 1 having thoroughly dispersed therein (b) a dormant curing agent for said polymer which is activated by the presence of moisture and (c) a desiccating, deliquescent accelerating agent adapted to maintain said polymer dry prior to deposition for use, to attract and absorb said moisture from said surroundings after deposition and to hasten the curing of said polymer by said curing agent.

16. A composition according to claim 15, wherein the dormant curing agent and the desiccating, deliquescent accelerating agent are the same compound and are selected from the group consiting of alkali metal peroxide and alkaline earth metal peroxide.

17. In a process of treating liquid mercaptan terminated polyether polymers of claim 1 to produce completely cured elastomers, the steps of (a) intimately mixing said liquid polymer with a dormant curing agent for said polymer which is activated by the presence of moisture and a desiccating, deliquescent accelerating agent adapted to dry said polymer prior to deposition, to attract and absorb moisture from said surroundings of said mixture after deposition and to hasten the curing of said polymer by said curing agent; (b) maintaining said mixture in dry surroundings during shipment and storage; and then (c) contacting said mixture after deposition in place with moisture-containing surroundings to cure said mixture.

References Cited

UNITED STATES PATENTS

| | | | |
|---|---|---|---|
| 2,518,245 | 8/1950 | Morris et al. | 260—609 |
| 3,005,853 | 10/1961 | Wilgus et al. | 260—609 |
| 3,225,017 | 12/1965 | Seegman et al. | 260—79.1 |
| 3,258,495 | 6/1966 | Le Fave et al. | 260—609 |
| 3,278,496 | 10/1966 | Le Fave et al. | 260—79 |
| 3,338,975 | 8/1967 | Farber et al. | 260—609 |

WILLIAM H. SHORT, *Primary Examiner.*

HOWARD SCHAIN, *Assistant Examiner.*

U.S. Cl. X.R.

260—18, 28, 29.2, 30.8, 32.8, 33.4, 33.6, 33.8, 34.2, 37, 47, 61, 79, 609, 830